(12) United States Patent
Honma

(10) Patent No.: US 7,369,704 B2
(45) Date of Patent: May 6, 2008

(54) IMAGE PROCESSING APPARATUS, IMAGE PROCESSING SYSTEM, AND IMAGE PROCESSING METHOD

(75) Inventor: Tomoyuki Honma, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 548 days.

(21) Appl. No.: 11/130,941

(22) Filed: May 17, 2005

(65) Prior Publication Data

US 2005/0259872 A1 Nov. 24, 2005

(30) Foreign Application Priority Data

May 18, 2004 (JP) ............................ 2004-147928

(51) Int. Cl.
*G06K 9/72* (2006.01)
(52) U.S. Cl. ................... 382/229; 455/557; 455/575.1; 358/1.11; 358/1.16; 358/1.9
(58) Field of Classification Search ................ 382/229; 455/557; 358/1.18
See application file for complete search history.

(56) References Cited

U.S. PATENT DOCUMENTS

2003/0184780 A1 * 10/2003 Matsuda ..................... 358/1.11
2005/0221856 A1 * 10/2005 Hirano et al. ............... 455/557

FOREIGN PATENT DOCUMENTS

| JP | 2000-259633 | 9/2000 |
| JP | 2003-162353 | 6/2003 |
| JP | 2003-178067 | 6/2003 |

* cited by examiner

*Primary Examiner*—Samir Ahmed
*Assistant Examiner*—Aklilu K Woldemariam
(74) *Attorney, Agent, or Firm*—Renner, Otto, Boisselle & Sklar, LLP

(57) ABSTRACT

In a circumstance where an image processing apparatus is connected to and capable of communicating with a plurality of processing servers each performing a specific data processing service, what kind of processing is performed on document image data read out from a document by image reading means is determined in accordance with the document image data. Then an address of a processing server capable of performing the processing thus determined is searched. Then at least a part of the document image data or character-string image extracted therefrom is supplied to the address thus searched, and the data processing service is requested. From this address, a result of the data processing service is obtained, and the obtained result of the data processing service is outputted. With this arrangement, when an image is read out from a document and a result of image processing corresponding to a character-string image in the document image, it is possible to efficiently utilize the processing resources such as dictionary information and a program, which are required for performing data processing on the character-string image.

5 Claims, 4 Drawing Sheets

| FONT DATA TABLE | | | |
|---|---|---|---|
| NAME OF LANGUAGE | FONT IMAGE FOR CHECKING | REFERENCE ASPECT RATIO | FONT PITCH |
| JAPANESE | あ(5)、ア(5)、... | 1.0x1.0(10) | FIXED (3) |
| CHINESE | 关(4)、于(3)、... | 1.0x1.0(10) | FIXED (3) |
| FRENCH | à(2)、è(2)、... | 0.5x1.0(15) | VARIABLE (3) |
| RUSSIAN | ... | 1.0x1.0(10) | FIXED (3) |

FIG. 4

LANGUAGE DETERMINATION TABLE

| COORDINATES OF AREA | NAME OF LANGUAGE |
|---|---|
| (20,20)-(180,30) | JAPANESE |
| (20,40)-(180, 50) | CHINESE |
| (50,80)-(130,140) | FRENCH |
| . . . | . . . | d3, d31, d32

FIG. 5

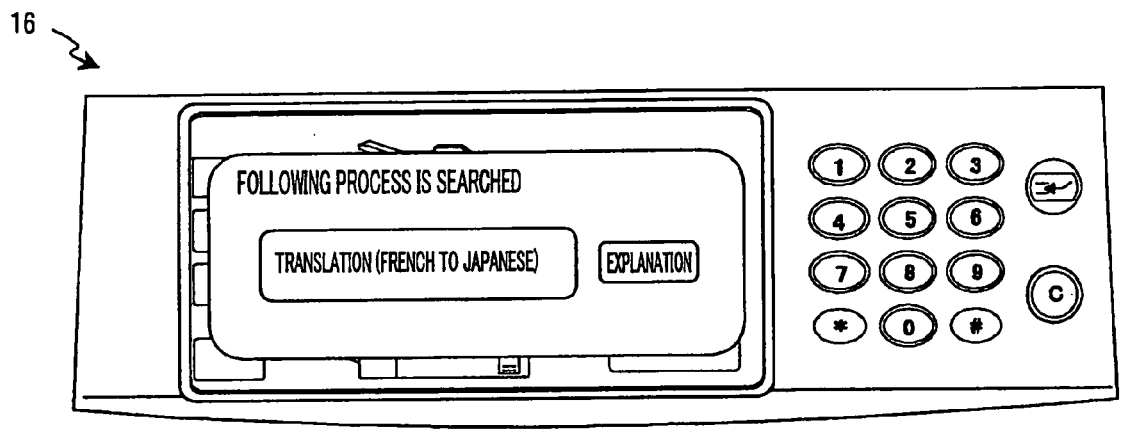

16

FOLLOWING PROCESS IS SEARCHED

TRANSLATION (FRENCH TO JAPANESE) | EXPLANATION

FIG. 6

PROCESS SEARCH TABLE d5, d51, d52, d53, d54

| NAME OF PROCESS | EXPLANATION OF FUNCTION | TECHNICAL TERMS | ADDRESS |
|---|---|---|---|
| TRANSLATION (ENGLISH TO JAPANESE) | TRANSLATION FROM ENGLISH TO JAPANESE | NONE | //serverA/_ |
| TRANSLATION (FRENCH TO JAPANESE) | TRANSLATION FROM FRENCH TO JAPANESE | NONE | //serverB/_ |
| COMMENTARY (INFORMATION PROCESSING) | COMMENTARY ON VOCABULARY FOR INFORMATION PROCESSING | PC, PROGRAM, ETC. | //serverA/_ |
| COMMENTARY (MEDICAL CARE) | COMMENTARY ON VOCABULARY FOR MEDICAL CARE | CT, GAMMA RAYS, CANCER, ETC. | //serverC/_ |
| ..... | ..... | ..... | ..... |

IMAGE PROCESSING APPARATUS, IMAGE PROCESSING SYSTEM, AND IMAGE PROCESSING METHOD

This Nonprovisional application claims priority under 35 U.S.C. § 119(a) on Patent Application No. 2004-147928 filed in Japan on May 18, 2004, the entire contents of which are hereby incorporated by reference.

FIELD OF THE INVENTION

The present invention relates to an image processing apparatus performing image processing on a character-string image, an image processing system, an image processing method, an image processing program, and a computer-readable storage medium storing the image processing program.

BACKGROUND OF THE INVENTION

Image processing apparatuses such as photocopiers, scanners, facsimile machines, and multifunction devices functioning as these devices, or image processing systems including such an image processing apparatus, have conventionally been arranged such that an image is read out from a document, the document image is subjected to various types of image processing, and the image processing result is produced as an output, e.g. printed onto a sheet or supplied to another image processing apparatus and/or an information processing apparatus.

Japanese Laid-Open Patent Application No. 2000-259633 (published on Sep. 22, 2000) discloses a multipurpose network translation system using a translation server and translation client devices each made up of a multipurpose information processing apparatus such as PC, the translation system being arranged such that the translation server stores a plurality of specialized dictionaries, and the translation client devices shares the translation server and the dictionaries stored therein.

Meanwhile, documents to be read by the image processing apparatus often include character-string images. With regard to these character-string images, user-friendliness of the image processing apparatus would improve if a result of processing such as a translation process described in Japanese Laid-Open Patent Application No. 2000-259633 can be outputted by the apparatus.

To apply the technique of Japanese Laid-Open Patent Application No. 2000-259633 to the image processing system, character-string information in a document image read out from a document is extracted, and the extracted character-string information is subjected to the translation process performed by the translation server. Not being limited to the translation, explanatory information of technical words in the character-string information may be outputted.

However, to apply the technique of Japanese Laid-Open Patent Application No. 2000-259633 to the image processing system, it is necessary to provide, in the server connected to the image processing apparatuses via a network, a processing section for subjecting the extracted character-string information to processing (e.g. translation process). On this account, each server (e.g. a server on a LAN) that is set beforehand as a target of access from the image processing apparatuses is required to have processing resources such as dictionaries of various languages and specialized fields, dictionaries of various technical terms, and a program for processing these dictionaries. Furthermore, to support a lot of languages and specialized fields, each server that is set beforehand as a target of access from the image processing apparatuses is required to have high-capacity storage means and the like, so that the processing resources are not efficiently utilized. In particular, it is very inefficient to store some types of processing resources, such as dictionary data and programs corresponding to languages and specialized fields not frequently used, in each server that is set beforehand as a target of access from the image processing apparatuses.

SUMMARY OF THE INVENTION

The present invention was done to solve the above-identified problem. The objective of the present invention is therefore to provide: an image processing apparatus that efficiently utilizes, when image processing is performed in accordance with a character-string image, processing resources such as dictionary information and a programs that are required for processing the character-string image; an image processing system; an image processing method; an image processing program; and a computer-readable storage medium storing the image processing program.

To solve the problem above, an image processing apparatus of the present invention, which performs image processing on an image including a character-string image, based on a result of data processing performed on either the character-string image or information extracted from the character-string image, comprises: a communication section for communicating with a plurality of data processing service devices that perform, on received data, respective data processing services that are different from each other, and return results of the data processing services; a service address search section for searching for an address of a data processing service device that is capable of performing a required kind of data processing on either the character-string image or the information extracted from the character-string image; a character-string data processing service request section for sending, to the address searched by the service address search section and via the communication section, (i) the character-string image or the information extracted from the character-string image, and (ii) information for requesting a data processing service on either the character-string image or the information extracted from the character-string image; and a process result receiving section for receiving, via the communication section, a result of the data processing service performed on either the character-string image or the information extracted from the character-string image.

According to the above-described image processing apparatus, a required data processing service is obtained in such a manner that an address searched by the service address search section is requested to perform the data processing service (e.g. translation and commentary) on a character-string image. On this account, it is unnecessary to provide, in each image processing apparatus, the processing resources such as dictionary information and a programs required for performing data processing on the character-string image or the information extracted from the character-string image. Moreover, it is possible to efficiently utilize the processing resources such as dictionary information and a program, which are required for performing data processing on the character-string image or the information extracted from the character-string image, and are stored in data processing service devices around the world, the data processing service devices being able to communicate with each other over the Internet.

To solve the problem above, an image processing system of the present invention comprises: a plurality of data processing service devices that perform, on received data, respective data processing services that are different from each other, and return results of the data processing services; an image processing apparatus that performs image processing on an image including a character-string image, based on a result of data processing performed, by one of said plurality of data processing service devices, on either the character-string image or information extracted from the character-string image; and an information processing apparatus that is capable of communicating with the image processing apparatus, the image processing apparatus including a communication section for communicating with the data processing service devices and the information processing apparatus, the image processing system further comprising: a service address search section that is provided in the information processing apparatus, and searches for an address of a data processing service device that is capable of performing a required kind of data processing on either the character-string image or the information extracted from the character-string image; a character-string data processing service request section that is provided in either the image processing apparatus or the information processing apparatus, and sends, to the address searched by the service address search section, (i) the character-string image or the information extracted from the character-string image, and (ii) information for requesting the data processing service on either the character-string image or the information extracted from the character-string image; and a process result receiving section that is provided in the image processing apparatus, and receives, from one of the data processing service devices, a result of the data processing service performed on either the character-string image or the information extracted from the character-string image.

According to this arrangement, an efficient system is constructed because it is unnecessary to provide the service address search section in each image processing apparatus.

An image processing method of the present invention, which uses an image processing system adopting: a plurality of data processing service devices that perform, on received data, respective data processing services that are different from each other, and return results of the data processing services; and an image processing apparatus that is capable of communicating with the data processing service devices and performs image processing on an image including a character-string image, based on a result of data processing performed, by one of said plurality of data processing service devices, on either the character-string image or information extracted from the character-string image, comprises the steps of: (i) searching for an address of a data processing service device that is capable of performing a required kind of data processing on either the character-string image or the information extracted from the character-string image; (ii) sending, from the image processing apparatus to the address searched in the step (i), (I) the character-string image or the information extracted from the character-string image, and (II) information for requesting the data processing service on either the character-string image or the information extracted from the character-string image; and (iii) sending, from the data processing service device with the address searched in the step (i) to the image processing apparatus, a result of the data processing service performed on either the character-string image or the information extracted from the character-string image.

According to this image processing method, the image processing apparatus can receive a required data processing service, by requesting an address searched by the service address search section to perform the data processing service (e.g. translation and commentary) on the character-string image. On this account, it is unnecessary to provide, in each image processing apparatus, the processing resources such as dictionary information and a program required for performing data processing on the character-string image or the information extracted from the character-string image.

An image processing program of the present invention is a program that causes a computer to execute the steps of the aforesaid image processing method. Therefore, by causing a computer to execute the program it is possible to allow the computer to realize the image processing method of the present invention.

In addition to the above, the image processing program of the present invention is easily stored and distributed when the program is stored in a computer-readable storage medium. Furthermore, by causing a computer to read the storage medium, it is possible to allow the computer to realize the image processing method of the present invention.

For a fuller understanding of the nature and advantages of the invention, reference should be made to the ensuing detailed description taken in conjunction with the accompanying drawings.

BRIEF DESCRIPTION OF THE DRAWINGS

FIG. 4 shows the content (result of determination by a language analyzing section) of a language determination table of the image processing system X.

FIG. 5 shows an example of a service selection screen in the image processing system X.

FIG. 6 shows an example of a data structure of a process search table stored in a search server of the image processing system X.

DESCRIPTION OF THE EMBODIMENTS

The following will describe an embodiment of the present invention in reference to figures. The present embodiment is merely an example of the present invention, so as not to limit the technical scope of the present invention.

Figure 1:
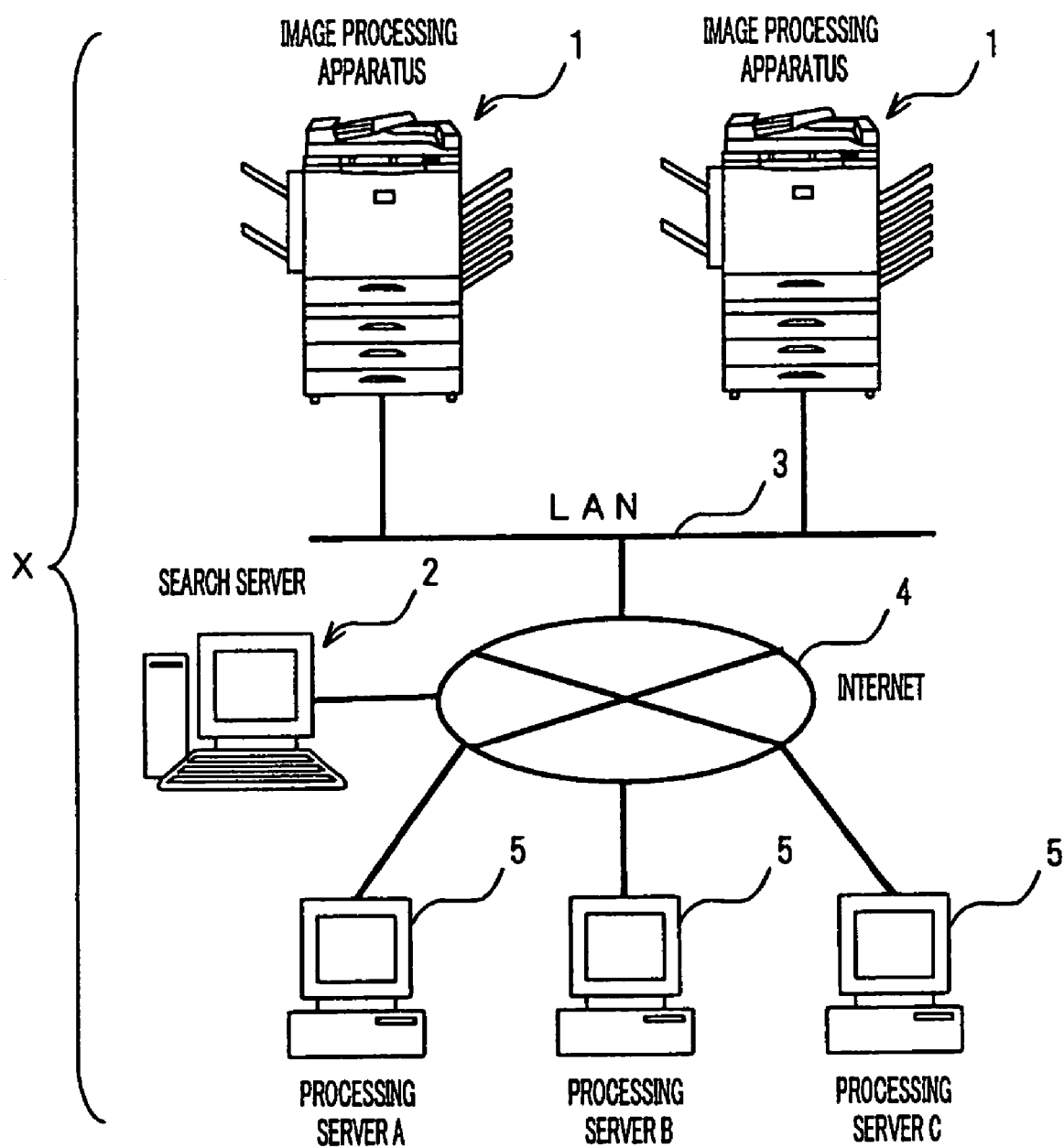
FIG. 1 is a system configuration view schematically showing an image processing system X of an embodiment of the present invention.

FIG. 1 is a system configuration view schematically showing an image processing system X of the present embodiment.

As shown in this figure, the image processing system X includes a plurality of image processing apparatuses 1 and a search server 2. These devices are connected and can communicate with each other via IEEE 802.03-compliant devices, a LAN 3 based on the TCP/IP protocol, and the Internet 4.

The image processing system X is arranged in such a manner that the image processing apparatuses 1 and the search server 2 are, over the Internet 4 (or a public communications network and the like), capable of communicating with processing servers 5 (processing servers A, B, and so on) that are data processing service devices each performing a specific data processing service.

Figures 2, 3:
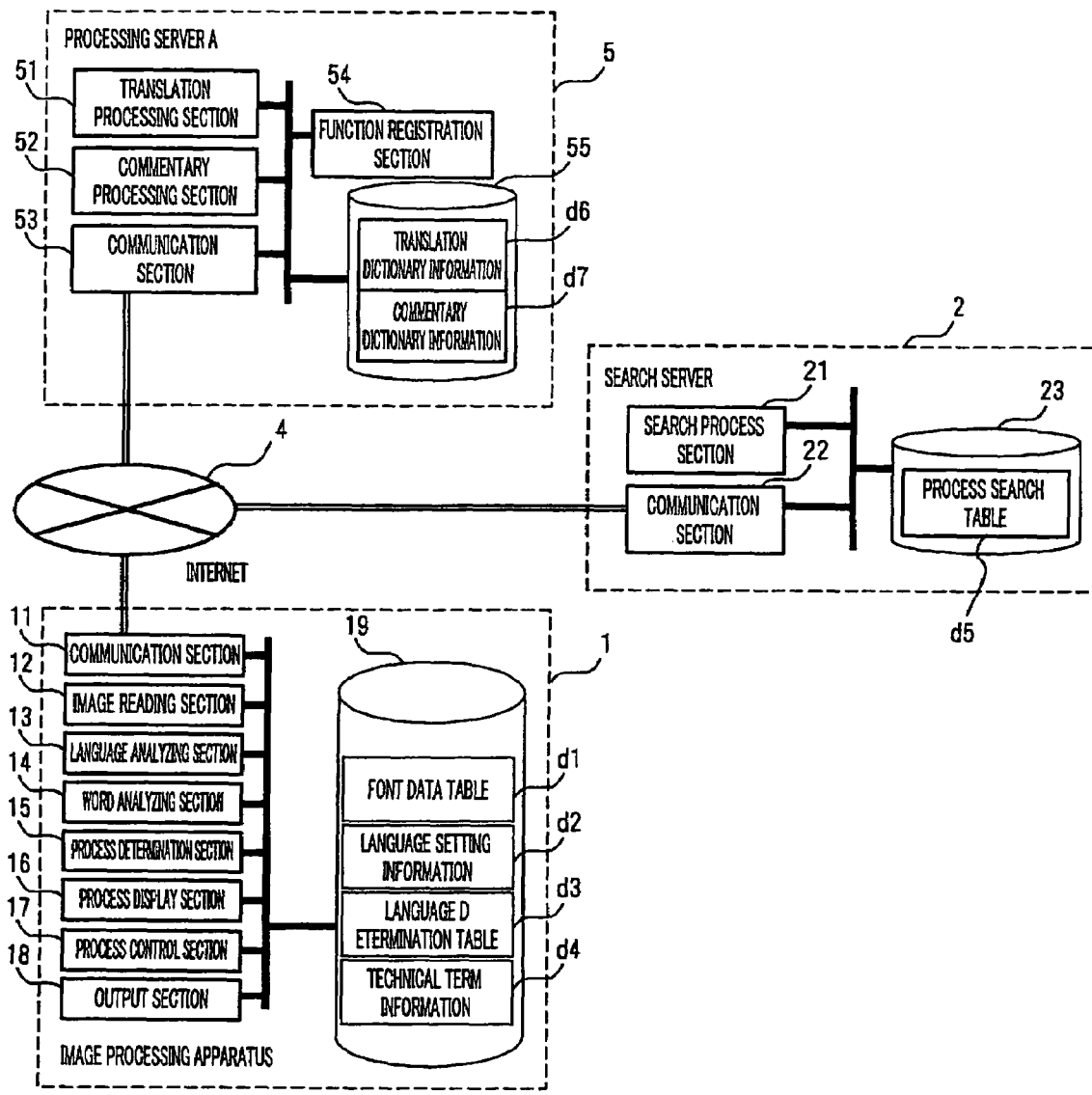
FIG. 2 is a block diagram schematically showing the image processing system X.
FIG. 3 schematically shows a font data table of the image processing system X.

FIG. 2 is a block diagram schematically showing the image processing system X.

The image processing apparatus 1 includes a communication section 11, an image reading section 12, a language analyzing section 13, a word analyzing section 14, a process determination section 15, a process display section 16, a process control section 17, an output section 18, and a data storage section 19.

The communication section 11 controls communications between the search server 2 and the processing servers 5, via the LAN 3 (not illustrated in FIG. 2) and the Internet 4. Also, the communication section 11 supplies (outputs), to another image processing apparatus 1, a personal computer (not illustrated) and the like, either a document image read by the image reading section 12 or a result of image processing performed on the document image. The document image or the result of the image processing are outputted as image data or e-mail data. In short, the communication section 11 functions as one example of image processing result output means (image processing result output section).

The image reading section 12 is an example of image reading means (image reading section), reading an image from a document. This image reading section 12 includes, for example, light emitting means that gives out light onto a document, an optical system that guides light reflected on the document, and photoelectric conversion means such as CCD, which subjects the light guided by the optical system to photoelectric conversion, so as to output image data of the document.

The process display section 16 displays information such as a message to the user, and is made up of a liquid crystal panel and the like.

The process control section 17 controls the components of the image processing apparatus 1. The processing control section 17 is made up of a CPU and its peripheral devices such as ROM and RAM, and controls the components of the image processing apparatus 1 by causing the CPU to execute a control program that has been stored in the ROM in advance.

The output section 18 is an example of image processing result output means (image processing result output section), and outputs, to a recording sheet and the like, either a document image read out by the image reading section 12 or the result of image processing performed on the document image. The output section 18 includes, for instance, a photosensitive drum supporting the image, a charging device for charging the photosensitive drum, a laser scan unit for writing an electrostatic image onto the photosensitive drum, a developing device for developing the electrostatic image by means of toner, and a transfer device for transferring the toner image onto a recording sheet, and the like.

The data storage section 19 is storage means such as a hard disk device, and stores image data read out by the image reading section 12 and other types of data (e.g. font data table d1, language setting information d2, language determination table d3, and technical term information d4).

The language analyzing section 13, word analyzing section 14, and process determination section 15 are made up of computing means including a CPU, a ROM storing a predetermined program, a RAM functioning as a main storage area, and the like, and perform processes by causing the CPU to execute the program that has been stored in the ROM in advance.

The language analyzing section 13 is an example of character-setting image extraction means (character-setting image extraction section) and document language determination means (document language determination section). This language analyzing section 13 extracts a character-string image from document image data that is read out by the image reading section 12, and determines the (kind of) language of the extracted character-string image.

The word analyzing section 14 is an example of word identification means (word identification section), and finds words in the character-string image extracted from the document image data by the language analyzing section 13.

The processing determination section 15 is an example of document character-string process determination means (document character-string process determination section). The process determination section 15 determines what type of process is performed on the character-string image in the document image data, in accordance with the document image data read out from the document by the image reading section 12.

It is noted that specific descriptions regarding the processes performed by the language analyzing section 13, the word analyzing section 14, and the process determination section 15 are given later.

The search server 2 is an information processing apparatus including communication means, and includes a search process section 21, a communication section 22, and a data storage section 23.

The search process section 21 is an example of service address search means (service address search section), and searches an address of a processing server 5 (an example of the data processing service apparatus) that can execute the process that relates to the character-string image and is selected by the process determination section 15 of the image processing apparatus 1. The search process section 21 includes computing means made up of a CPU, ROM, RAM, and the like, and performs the aforesaid search by executing a program stored in the ROM.

The communication section 22 controls the communications between (i) the image processing apparatuses 1 and the processing servers 5 and (ii) the search server 2, by IEEE 802.03-compliant communication devices and based on the TCP/IP protocol and the like, and through the Internet 4.

The data storage section 23 is storage means such as a hard disk device, and stores data required for, for instance, the process carried out by the search process section 21.

The processing servers 5 are information processing apparatuses including communication means as in the case of the search server 2. Each of the processing servers 5 includes: a data storage section 55 that is storage means such as a hard disk; and a communication section 53 that controls communications between the processing server 5 and the image processing apparatus 1 and/or the search server 2, over the Internet 4.

Each of the processing servers 5 (processing servers A, B, and so on) further includes components required for performing a specific data processing service.

FIG. 2 shows an example of the processing server 5. The processing server 5 (processing server A) in this figure includes a translation processing section 51, a commentary processing section 52, communication section 53, a function registration section 54, and a data storage section 55. The data storage section 55 stores translation dictionary information d6 and commentary dictionary information d7.

Referring to the translation dictionary information d6 stored (kept) in the data storage section 55, the translation processing section 51 performs a translation processing service (an example of the data processing service) that converts a given character-string image or character-string information into character-string information in which the words are translated into a specified language.

Referring to the commentary dictionary information d7 stored (kept) in the data storage section 55, the commentary processing section 52 performs a commentary processing service (an example of the data processing service) that generates commentary information of a given word.

When a new data processing service function is added to the processing server 5 (i.e. a new data processing service program is installed thereto), the function registration section 54 notifies the search server 2 of (i) address information of a communication counterpart of the processing server 5 over the Internet 4 and (ii) information such as a format of request information used for requesting the processing server 5 to perform the added service.

The translation processing section 51, commentary processing section 52, function registration section 54 are made up of computing means including a CPU, a ROM storing a predetermined program, a RAM functioning as a main storage area, and the like, and perform the processes by causing the CPU to execute the program stored in the ROM and the data storage section 55 in advance.

Figure 7:
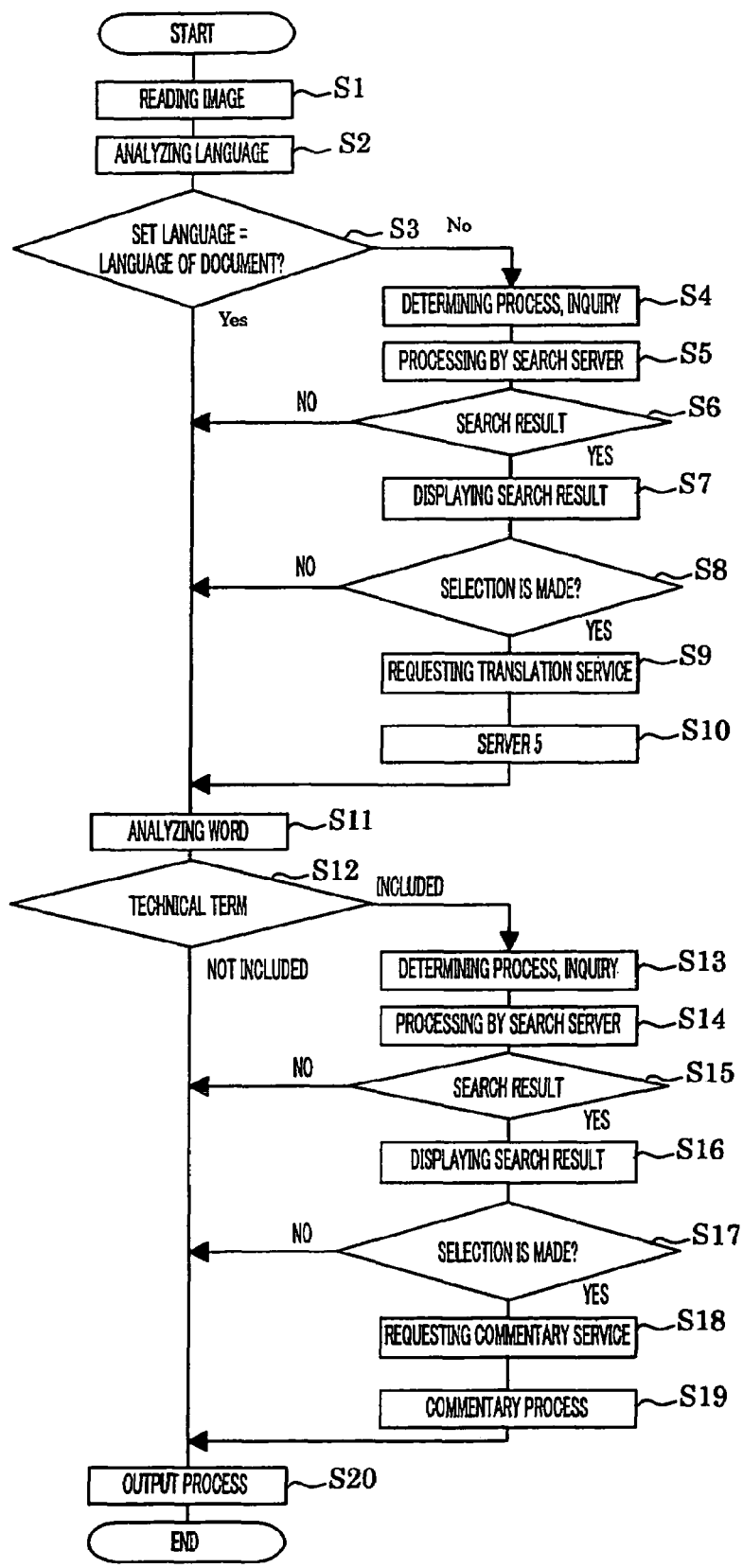
FIG. 7 is a flowchart illustrating steps of the processing performed by the image processing system X.

Referring to a flowchart in FIG. 7, the steps of the processing in the image processing system X are described. In the following description, S1, S2, and so on are symbols indicating the respective steps of the processing.

First, when, in the image processing apparatus 1, an operation section of the image reading section 12 is instructed to start document reading, the process control section 17 causes the image reading section 12 to read an image (document image data) from a document (S1).

Then the process control section 17 causes the language analyzing section 13 to perform a language analyzing process that determines the (kind of) language of the words in the character-string image in the document image data read out by the image reading section 12 (S2).

More specifically, upon receiving, from the process control section 17, an instruction to perform the language analyzing process, the language analyzing section 13 performs a well-known word recognition process on the document image data read out by the image reading section 12. That is, in the word recognition process, an area in the document image data, where a character-string image exists, is specified, an image (character-string image) in the specified area is extracted, and a font image (character image) is further extracted from the extracted character-string image (hereinafter, this font image being extracted is referred to as extracted font image). Then with regard to each specified area (e.g. an area of a character string for one line), predetermined (kinds of) languages are rated in reference to three indices, in terms of which language is likely to be used in the character-string image in the specified area. The scores as a result of the ratings are then added up for each (kind of) language, and consequently a language having the highest score is determined as a language of the specified area (i.e. a language by which the character-string information in the specified area is written).

It is noted that the rating is carried out by the language analyzing section 13, using the font data table d1 that is stored in the data storage section 19 in advance.

FIG. 3 schematically illustrates the font data table d1. As shown in this figure, the font data table d1 includes, for each of predetermined languages, font image checking information d11, reference aspect ratio information d12, and font pitch information d13. The font image checking information d1 is used for checking the degree of matching with a shape of an extracted font image, and is bitmap information, for example. The reference aspect ratio information d12 relates to an aspect ratio that is a characteristic of an outline of the extracted font image. The font pitch information d13 relates to relative positions of (i.e. a gap between) the extracted font images (i.e. indicating whether the pitch of the images is fixed or variable).

Note that a predetermined score is set at each of the font image checking information d11, reference aspect ratiom-information d12, and font pitch information d13. The numbers in the brackets in FIG. 3 indicate these scores.

For instance, as shown in FIG. 3, in the font image checking information d11, font images peculiar to Japanese, e.g. "あ" and "ア", are stored as images belonging to "Japanese" (a kind of language).

Languages such as Japanese and Chinese are characterized in that most of the characters are roughly 1:1 in aspect ratio. For this reason, the reference aspect ratio information d12 to which these languages belong is set at "1.0×1.0". In the meantime, as another example, the reference aspect ratio information d12 to which French belongs is set at "0.5×1.0".

In languages such as Japanese, a font pitch (character spacing) indicating relative positions of the characters is fixed. Meanwhile, in most of Western languages such as English, the font pitch is variable. In this regard, the font pitch is accordingly set (at either "fixed" or "variable").

The language analyzing section 13 carries out pattern-matching between each extracted font image in the specified area and each set of font image checking information d11. In doing so, which set of font image checking information d11 has a degree of matching higher than a predetermined level. If there exists a set of font image checking information d11 whose degree of matching is higher than the predetermined level, the language analyzing section 13 recognizes that characters (character code) indicated by that set of font image checking information d11 correspond to the characters in the extracted font image (this process is termed "character recognition"). The language analyzing section 13 then adds, to the language to which the recognized characters belong, a score set at that set of font image checking information d11.

If more than one set of font image checking information d11 corresponding to more than one languages have degrees of matching higher than the predetermined level, the language analyzing section 13 adds scores to the respective languages. On the other hand, if more than one set of font image checking information d1 corresponding to one language have degrees of matching higher than the predetermined level, the language analyzing section 13 adds, to said one language, only the score of a set of font image checking information d11 having the highest degree of matching.

In an example of the font data table d1 shown in FIG. 3, the pattern matching confirms that the degree of matching between the extracted font image and a character "あ" is higher than the predetermined level. In this case, the language analyzing section 13 recognizes that the extracted font image is the character "あ", and adds "5" to "Japanese".

Furthermore, with respect to each extracted font image in the specified area, the language analyzing section 13 figures out the aspect ratio that is a characteristic feature of the characters. Also the language analyzing section 13 figures out an average value of the aspect ratios of those extracted font images in the specified area. Furthermore, the language analyzing section 13 determines that which set of the reference aspect ratio information d12 in the font data table d1 most approximates to the average value of the aspect ratios thus figured out, and adds, to the language of the most approximated set of the reference aspect ratio information d12, a score set at that set of the reference aspect ratio information d12.

If more than one set of reference aspect ratio information d12 corresponding to more than one language approximate to the average value in the same degree, the language analyzing section 13 adds a score to each of these languages.

For instance, in the example of the font data table d1 shown in FIG. 3, the average value of the aspect ratios is roughly 1.0×1.0, so that the language analyzing section 13 adds "10" to Japanese, Chinese, and Russian, respectively.

In addition to the above, with respect to each of the extracted font images in the specified area, the language analyzing section 13 figures out a gap between (i.e. relative positions of) neighboring extracted font images, i.e. figures out a font pitch that is a gap between the extracted font images (the font pitch is, for instance, represented as a ratio between the width of one extracted font image and a gap between said one extracted font image and a neighboring font image). Also, the language analyzing section 13 figures out a variance of font pitches in the specified area. Moreover, the language analyzing section 13 determines whether or not the variance of the font pitches thus figured out is not more than a predetermined threshold value. If the variance is not less than the predetermined value, the language analyzing section 13 determines that the language is "variable pitch". If the variance is less than the predetermined value, the language analyzing section 13 determines that the language is "fixed pitch". The language analyzing section 13 then adds, to the language of the set of font pitch information d13 corresponding to the result of the determination ("variable pitch" or "fixed pitch"), a score set at that set of font pitch information d13. The way of adding the score here is similar to the way of adding the scores in regard to the aforesaid aspect ratio.

For instance, in the example of the font data table d1 shown in FIG. 3, if a variance of a font pitch of a language is not less than the threshold value, the language analyzing section 13 determines that the language is "variable pitch", and adds "3" to French.

When, for instance, there exist more than one language having scores exceeding a predetermined reference score, or when more than one language are included in a predetermined score range from the highest score, the language analyzing section 13 may re-specify an area and perform the language determination again.

After the above-described process (rating and adding up of scores) finishes with respect to each extracted font image in the specified area, the language analyzing section 13 determines that the language having the highest score is the (kind of) language by which the character-string image in the area is written, and stores the result of the determination in the data storage section 19, as a language determination table d3.

FIG. 4 shows the content of the language determination table d3 (the result of the determination by the language analyzing section 13) stored in the data storage section 19. As shown in this figure, the language determination table d3 stores coordinate information d31 indicating coordinates of the area in the document image data and language information (kind of language) d32 indicating a language that is determined as the language of the area, the coordinate information d31 and the language information d32 being associated to each other.

In this manner, with respect to each character image constituting the character-string image extracted from the document image data, the language analyzing section 13 determines the (kind of) language, according to (i) the result of character recognition, (ii) the aspect ratio that is a characteristic feature of the characters, and (iii) the font pitch indicating relative positions of the character images constituting the character-string image. As a matter of course, the determination may be performed according to only one of these (i)-(iii), or according to any two of these (i)-(iii).

After finishing S2, the process control section 17 causes the process determination section 15 to determine if a (kind of) set language that is set in advance as the language setting information d2 in the data storage section 19 is matched with the language of each area, which is stored in the language determination table d3. In other words, the process determination section 15 is caused to determine if the set language is matched with the (kind of) language determined by the language analyzing section 13 (S3).

If the languages are matched, the process determination section 15 judges that it is unnecessary to request the processing server 5 to perform the translation processing service. In this case, the process control section 17 shifts to the below-mentioned step S11.

On the other hand, if the languages are not matched (i.e. different), the process determination section 15 judges that it is necessary to perform the translation processing service. That is to say, the process determination section 15 chooses, as a process performed on the character-string image, the translation processing service that converts the character-string information, which is extracted from the character-string image in the document image data by the language analyzing section 13, into the character-string information translated into the set language (i.e. the language determined by the language analyzing section 13 is translated into the set language that is set in advance as the language setting information d2). In this case, the process control section 17 inquires, via the communication section 11, of the search server 2 what is an address of the processing server 5 that can perform the required translation processing service (S4).

In line with the notification that is supplied from the image processing apparatus 1 and received by the communication section 22, the search process section 21 in the search server 2 searches an address of the processing server 5 that can perform the translation processing service, and notifies (returns) the image processing apparatus 1 of the search result (S5).

FIG. 6 shows an example of a data structure of a process search table d5 stored in the data storage section 23 of the search server 2.

Registered (stored) in the process search table d5 are: process name information d51 for identifying the types of data processing functions of the respective processing servers 5 (A, B, C, and so on); function explanatory information d52 indicating the content of each data processing function; technical term information d53 storing technical terms corresponding to a commentary process (process for obtaining explanatory information of a word), when the process name information d51 indicates the commentary process; and address information d54 of a processing server 5 (one of processing server A, B, C, and so on) that performs the data processing service corresponding to the process name information d51, these sets of information d51-d54 being associated with one another.

Although not being illustrated in FIG. 6, further registered in the process search table d5 is information such as a format of request information used for requesting the processing server 5 to perform the data processing service.

When a new data processing service function is added to the processing server 5 (i.e. a new data processing service program is installed thereto), the function registration section 54 of that processing server 5 notifies the search server 2 of information (processing name information d51, function explanatory information d52, technical term information d53, address information d54, and the like) related to the added new data processing service function, via the communication section 53 and the Internet 4. Then when the communication section 22 receives information regarding the new data processing service function, the search process section 21 of the search server 2 registers (stores) the information to (in) the process search table d5.

In the aforesaid step S4, if the process control section 17 of the image processing apparatus 1 inquires of the search server 2 what is an address of the processing server 5 that can perform the translation processing service (data processing service), the process control section 17 notifies the search server 2 of the process name information d51 corresponding to the translation processing service.

In the aforesaid step S5, the search process section 21 of the search server 2 searches, in the process search table d5, for information matched with the process name information d51 notified from the image processing apparatus 1, so as to return the search result to the image processing apparatus 1 via the communication section 22.

If there exists the information matched with the target of the search, the search process section 21 returns, to the image processing apparatus 1, the corresponding address information d54 and function explanatory information d52. If there exists no matched information, the image processing apparatus 1 is notified so.

In the image processing apparatus 1, the process control section 17 causes the process determination section 15 to determine if an address of the processing server 5 that can perform the searched data processing service exists, in accordance with the search result supplied from the search server 2 via the communication section 11 (i.e. determines whether the search result is "yes" or "no") (S6).

If the process determination section 15 determines as "no", the process control section 17 shifts to the below-mentioned step S11. On the contrary, if the process determination section 15 determines as "yes", the process control section 17 causes the process display section 16 to display the search result as a service selection screen (S7).

FIG. 5 shows an example of the service selection screen displayed on the process display section 16.

The service selection screen displayed on the process display section 16 (display means; an example of service selection means) is used for displaying, to the user, information with regard to the process that is selected by the process determination section 15 and relates to the character-string image, so as to allow the user to decide whether or not the determined data processing service is carried out.

Alternatively, the following arrangement may be done: a plurality of processes are selected by the process determination section 15, addresses of the processing servers 5 that can carry out the respective processes are searched, and information with regard to the processes having the corresponding processing servers 5 is displayed. In this case, the user can select a desired data process from the displayed processes.

On the occasion above, the service selection screen displays, as an item to be selected, process name information d51. On the service selection screen, furthermore, the function explanatory information d52 is displayed in response to a predetermined operation (in FIG. 5, the process display section 16 is a touch-sensitive panel, so that the function explanatory information d52 appears in response to a touch on "explanation" area).

If this predetermined operation is performed, the process control section 17 causes the process display section 16 to display a button (e.g. "selection" button) for allowing for the selection of the corresponding data processing service, along with the function explanatory information d52. Touching this button, the user can instruct the process control section 17 to perform the data processing service.

Subsequently, the process control section 17 judges whether or not the translation processing service (data processing service) displayed on the service selection screen is selected (S8). If the translation processing service is not selected, the process control section 17 shifts to the step S11, without requesting the processing server 5 to perform the translation processing service.

On the other hand, if the translation processing service is selected (process performed on the character-string image is selected), the process control section 17 (an example of character-string data processing service request means (character-string data processing service request section)) requests the processing server 5, which can carry out the translation processing service (process) and has the address notified from the search server 2, to carry out the translation processing service. More specifically, to the address of the processing server 5 that can carry out the translation processing service (process) and has the address notified from the search server 2, the process control section 17 sends, via the communication section 11, (i) the character-string information extracted from the character-string image, and (ii) information (signal) for requesting that processing server 5 to carry out the service (an example of the data processing service) of translating (converting) the character-string information extracted from the character-string image into character-string information written in the language set in the language setting information d2.

In response to this, the processing server 5 receiving the service request performs the translation of the character-string information supplied to the translation processing section 51 via the communication section 53, and returns the process result (service result) to the image processing apparatus 1, via the communication section 53 (S11). The process control section 17 (an example of process result receiving means (process result receiving section)) of the image processing apparatus 1 receives, via the communication section 11, the process result from the address to which the data processing service is requested. The process result is then stored in the data storage section 19 (not illustrated).

Subsequently, the process control section 17 of the image processing apparatus 1 causes the word analyzing section 14 to perform a word analyzing process (S11). In this word analyzing process, recognized are words in the character-string image which was, in the step S2, extracted from the document image data by the language analyzing section 13.

In the word analyzing process, the word analyzing section 14 performs a well-known word recognition process in reference to a word dictionary (not illustrated) stored in advance in the data storage section 19, so as to extract words from the character string recognized by analyzing the matching between the extracted font image extracted by the language analyzing section 13 and the font image checking information d11. The word analyzing section 14 then stores the extracted words in the data storage section 19. On the occasion above, words not included in the word dictionary are judged as special technical terms. Those judged as the special technical terms are stored in the data storage section 19, as the technical term information d4.

Furthermore, the word analyzing section 14 judges that words that frequently appear or are frequently used (e.g. the number of words is not less than a predetermined constant) are likely to be words related to a specialized field to which the document belongs. The word analyzing section 14 thus stores those words of frequent use in the data storage section 19, as the technical term information d4.

The process control section 17 then causes the process determination section 15 to determine whether or not the technical term information d4 includes a word (technical term) (S12). If there is no word (technical term) in the technical term information d4, the process determination section 15 judges that it is unnecessary to make an additional request to the processing server 5. In this case, the process control section 17 shifts to the below-mentioned step S20.

On the contrary, if it is judged that the technical term information d4, which is the result of the analysis (word recognition result) by the word analyzing section 14 (an example of word identification means (word identification section)), includes a word (technical term) (i.e. if a character-string in the character-string image corresponds to a technical term), the process determination section 15 (an example of document character-string process determination means (document character-string process determination section)) chooses, as the process performed on the character-string image, the commentary processing service by which commentary information (an example of explanatory information) of the word (technical term) is obtained. In this case, the process control section 17 inquires, via the communication section 11, of the search server 2 for an address of the processing server 5 that can perform the commentary processing service (S13). On this occasion, the process control section 17 notifies the search server 2 of the process name information d51 corresponding to the commentary processing service, and sends, to the search server 2, the words (technical terms) in the technical term information d4.

In the meanwhile, in accordance with the notification from the image processing apparatus 1 to the communication section 22, the search process section 21 in the search server 2 refers to the process search table d5, search an address of the processing server 5 that can carry out the sought-after commentary processing service, and sends (returns) the search result to the image processing apparatus 1 (S14).

More specifically, the search process section 21 searches the process search table d5, for determining if the technical term information d53 includes a word matched with the word (technical term) supplied from the image processing apparatus 1, and returns the search result to the image processing apparatus 1, via the communication section 22.

The step S14 by the search process section 21 (an example of word field determination means (word field determination section) corresponds to the step of determining a specialized field to which the word identified by the word analyzing section 14 (an example of word identification means (word identification section) belongs.

If information corresponding to the target of the search exists, the search process section 21 sends the corresponding address information d54 and function explanatory information d52 to the image processing apparatus 1. If such information does not exist, the image processing apparatus 1 is notified so.

In the image processing apparatus 1, the process control section 17 causes the process determination section 15 to determine if the address of the processing server 5 that can perform the sought-after data processing service exists, in accordance with the search result supplied from the search server 2 via the communication section 11 (i.e. determines whether the search result is "yes" or "no") (S15).

In summary, in the steps S11-S14, the following commentary process is chosen as the process carried out on the character-string image: by the process determination section 15 (an example of document character-string process determination means (document character-string process determination section), commentary information (an example of explanatory information) of a word in a specialized field that is determined (searched) by the search process section 21 (an example of word field determination means) of the search server 2 is obtained.

Also, the steps S11-S14 are rephrased as follows: the process control section 17 causes the process determination section 15 to select, as the process carried out on the character-string image, the commentary process for obtaining commentary information (an example of explanatory information) of a word in the character-string image, based on the result of identification of the word by the word analyzing section 14 (an example of word identification means).

If the process determination section 15 determines that the search result is "no", the process control section 17 shifts to the below-mentioned step S20. Meanwhile, if the process determination section 15 determines that the search result is "yes", the process control section 17 displays, as the service selection screen (in FIG. 5), the search result on the process display section 16, as in the case of the step S7 (S15).

On the occasion above, the service selection screen displays, as an item to be selected, process name information d51 as in the case of S7. On the service selection screen, furthermore, the function explanatory information d52 is displayed in response to a predetermined operation (touching "explanation area in FIG. 5). If this predetermined operation is performed, the process control section 17 causes the process display section 16 to display a button (e.g. "selection" button) for allowing for the selection of the corresponding commentary processing service (data processing service), along with the function explanatory information d52. Touching this button, the user can instruct the process control section 17 to perform the commentary processing service.

Subsequently, the process control section 17 determines if the commentary processing service (data processing service) displayed on the service selection screen is selected (S15). If the selection of the commentary processing service (selection of the process performed on the character-string image) was not done, the process control section 17 shifts to the step S20.

If the selection of the commentary processing service was done, the process control section 17 (an example of character-string data processing service request means (character-string data processing service request section)) requests the processing server 5, which can perform the commentary processing service (process) and has the address notified from the search server 2, to perform the service (data processing service) to obtain commentary information of the word (S18). More specifically, to an address of the processing server 5 that can perform the commentary processing service (process) and has the address notified from the search server 2, the process control section 17 sends, via the communication section 11, (i) the character-string information extracted from the character-string image or the technical term information d4 (i.e. word) that is a part of the character-string information, and (ii) information for requesting the processing server 5 to perform a service (an example of the data processing service) of obtaining commentary information of the character-string information or the word.

In response to this, in the processing server 5 receiving the service request, the commentary processing section 52 performs a commentary process on either the character-string information or the technical term information d4 (word), which is supplied via the communication section 53. The result of the process (service result) is then returned to the image processing apparatus 1 via the communication section 53 (S19). From the address to which the data processing service is requested, the process control section 17 (an example of process result receiving means (process result receiving section)) of the image processing apparatus 1 receives the result of the process, via the communication section 11. The received result of the process is then stored in the data storage section 19 (not illustrated).

Subsequently, the process control section 17 of the image processing apparatus 1 outputs, from the output section 18 (an example of image processing result output means (image processing result output section)), the obtained result of the data processing service (S20).

More specifically, when the result of the translation processing service is obtained, the process control section 17 (i) forms an image based on image data that has been subjected to such image processing that the character-string image in the document image data read out by the image reading section 12 is replaced with visualization of the result of the translation processing service (i.e. the character-string information after the translation), and (ii) prints the image on a recording sheet by means of the output section 18.

When the result of the commentary processing service is obtained, the process control section 17 (i) forms an image in which a predetermined mark (e.g. "*") is added to the character-string image of the document image data read out by the image reading section 12, the character-string image having been subjected to the commentary process, (ii) prints the image onto a recording sheet by means of the output section 18, and (iii) prints the visualization of the result of the commentary processing service (i.e. commentary information), onto a blank space of the printing sheet, another printing sheet, and the like.

In addition to the above, when, for instance, the present invention is adopted to an image processing apparatus such as a facsimile machine and a scanner, the result of the commentary processing service may be sent (outputted), as image data or e-mail data, to another image processing apparatus or information processing apparatus, in addition to or in place of the document image data read out from the document.

The present embodiment has described a system of searching an address of the processing server 5, by the search server 2 that is an information processing apparatus capable of communicating with the image processing apparatus 1. The present invention is, however, not limited to this system. For instance, the search process section 21 may be provided in the image processing apparatus 1.

Also, the following system configuration is feasible: at least one of the functions of the language analyzing section 13, word analyzing section 14, process determination section 15, and processing control section 17 that are provided in the image processing apparatus 1 is performed by an information processing apparatus (e.g. search server 2) capable of communicating with a plurality of image processing apparatuses 1, so that the aforesaid functions are shared with the image processing apparatuses 1. In this case, the document image data is sent from the image processing apparatus to the shared information processing apparatus, so as to be processed.

The above-described processing server 5 performs, with respect to the character-string information (character code string) supplied from the image processing apparatus 1, the data processing service such as the translation processing service and the commentary processing service. The present invention, however, is not limited to this. For instance, the data processing service such as the translation processing service and the commentary processing service may be performed after the whole document image data or the character-string image therein is obtained (received) and the character-string information is extracted from the image data. In this case, the image processing apparatus 1 sends whole or a part of document image data to the processing server 5, and requests the processing server 5 to perform the data processing service.

In the present embodiment, the process display section 16 can function as a display section for displaying information regarding data processing, and includes a service selection section for receiving an user's instruction with regard to data processing. The present invention is, however, not limited to this arrangement. The function of the display section and the function of the service selection section may be realized by different components.

The present invention may be provided as an image processing program that causes a computer to execute the processing performed by the image processing apparatus 1 or the image processing system X, or provided as a computer-readable storage medium storing the aforesaid image processing program.

In the present embodiment, the components of the image processing apparatus 1 are controlled by the process control section 17. However, instead of the process control section 17, the control may be done by an information processing apparatus that can read a program which is stored in a storage medium and is used for the control. Also, the following arrangement may be implemented: a storage medium stores a program for executing at least one of the processes performed by the language analyzing section 13, word analyzing section 14, process determination section 15, and process control section 17 of the image processing apparatus 1, the search process section 21 of the search server 2, and the translation processing section 51, commentary processing section 52, and function registration section 53 of the processing server 5, and an information processing apparatus that can read out the program is used instead of these components.

In this arrangement, a computing unit (e.g. CPU and MPU) of the information processing device reads out the program stored in the storage medium, and executes the processes. In other words, it is possible to say that the processes are realized by the program.

The above-mentioned information processing device may be a common computer (e.g. work station and personal computer), or an expansion board and an expansion unit attached to a computer.

The above-mentioned program is program code (e.g. an executable code program, intermediate code program, and source program) of software that realizes the processes. The program may be used by itself or may be used in conjunction with another program (e.g. OS). The program may be temporarily stored in a memory (e.g. RAM) in the device after being read out from the storage medium, and then read out again and executed.

The storage medium for storing the program may be easily detached from the information processing apparatus or may be fixed to (attached to) the apparatus. Moreover, the storage medium may be connected to the apparatus, as an external storage device.

The storage medium may be a magnetic tape such as a video tape or cassette tape; a magnetic disc such as Floppy® disc or hard disk; an optical disc (magneto-optical disc) such as CD-ROM, MO, MD, DVD, and CD-R; a memory card such as an IC card and an optical card; or a semiconductor memory, such as a mask ROM, EPROM, EEPROM, and a flash ROM.

The storage medium may be connected to the information processing apparatus through the intermediary of a network (e.g. intranet and Internet). In this case, the information processing apparatus downloads the program from the network. That is to say, the program may be obtained through a medium (a medium which holds the program in a flowing manner) such as a (wired or wireless) network. Note that, it is preferred if the download program is either stored in a main body device in advance or installed from another storage medium.

These types of programs may be computer data signals (data signal sequence). With this, for instance, the information processing apparatus can receive the computer data signals embedded in a carrier wave, so as to execute the programs.

As described above, an image processing apparatus of the present invention, which performs image processing on an image including a character-string image, based on a result of data processing performed, by one of said plurality of data processing service devices, on either the character-string image or information extracted from the character-string image, comprises: a communication section for communicating with a plurality of data processing service devices that perform, on received data, respective data processing services that are different from each other, and return results of the data processing services; a service address search section for searching for an address of a data processing service device that is capable of performing a required kind of data processing on either the character-string image or the information extracted from the character-string image; a character-string data processing service request section for sending, to the address searched by the service address search section and via the communication section, (i) the character-string image or the information extracted from the character-string image, and (ii) information for requesting a data processing service on either the character-string image or the information extracted from the character-string image; and a process result receiving section for receiving, via the communication section, a result of the data processing service performed on either the character-string image or the information extracted from the character-string image.

According to the above-described image processing apparatus, a required data processing service is obtained in such a manner that an address searched by the service address search section is requested to perform the data processing service (e.g. translation and commentary) on a character-string image. On this account, it is unnecessary to provide, in each image processing apparatus, the processing resources such as dictionary information and a program required for performing data processing on the character-string image or the information extracted from the character-string image. Moreover, it is possible to efficiently utilize the processing resources such as dictionary information and a program, which are required for performing data processing on the character-string image or the information extracted from the character-string image, and are stored in data processing service devices around the world, the data processing service devices being able to communicate with each other over the Internet.

In addition to the above, the image processing apparatus of the present invention may further include an image reading section for obtaining document image data by reading an image from a document; and a character-string image extraction section for extracting the character-string image from the obtained document image data.

With this arrangement, it is possible to obtain an image from a document and extract a character-string image from the obtained document image data. Then image processing can be performed on the character-string image, in accordance with a result of a data processing service performed on either the character-string image or the information extracted from the character-string image.

The above-described image processing apparatus of the present invention may further include: a document language determination section for determining a language of the character-string image; and a document character-string process determination section for determining what kind of the data processing is performed on either the character-string image or the information extracted from the character-string image, when the language of the character-string image determined by the document language determination section is different from a set language that has been set in advance, the document character-string process determination section selecting, as the data processing performed on either the character-string image or the information extracted from the character-string image, a translation processing service by which either the character-string image or the information extracted from the character-string image is converted into character-string information translated into the set language.

According to this arrangement, for instance, when a language regularly used by the user is set in the image processing apparatus in advance, it is possible to obtain, from the data processing service device, a result of a translation processing service performed on a character-string image written in a language other than the language set in advance, and perform image processing based on the obtained result.

The above-described image processing apparatus of the present invention may be arranged such that the document language determination section extracts character images from the character-string image made up of the character images, and determines the language, based on at least one of: a result of word recognition of each of the extracted character images; a characteristic of an outline of each of the extracted character images; and relative positions of the extracted character images.

The above-described image processing apparatus of the present invention may be arranged such that the document language determination section extracts a character image from the character-string image made up of the character images, and determines the language, based on an aspect ratio of the extracted character image.

With either one of the aforesaid document language determination sections, it is possible to determine, by performing a simple process, what kind of language is used.

The above-described image processing apparatus of the present invention may further include: a word identification section for finding a word in either the character-string image or the information extracted from the character-string image; and a document character-string process determination section for determining what kind of the data processing is performed on either the character-string image or the information extracted from the character-string image, the document character-string process determination section selecting, as the data processing performed on either the character-string image or the information extracted from the character-string image, a process of obtaining explanatory information of the word that is found in the character-string image by the word identification section.

The above-described image processing apparatus of the present invention may further include: a word field determination section for determining a field to which the word found by the word identification section belongs, the document character-string process determination section selecting, as the data processing performed on either the character-string image or the information extracted from the character-string image, a process of obtaining explanatory information of a word in the field determined by the word field determination section.

With this, for instance, even when a word that the image processing apparatus cannot identify (e.g. a word in a specialized field not supported by the image processing apparatus) is included in the character-string image, it is possible to obtain the explanatory information of the word, from the data processing service device.

The above-described image processing apparatus of the present invention may further include: a service selection section for receiving an instruction from a user, the instruction relating to data processing performed on either the character-string image or the information extracted from the character-string image, when an instruction of selecting a kind of the data processing performed on either the character-string image or the information extracted from the character-string image is sent via the service selection section, the service address search section searching for an address of a data processing service device that is capable of performing that kind of the data processing.

According to this arrangement, a service is provided only at the user's desire (selection).

The above-described image processing apparatus of the present invention may further include: a document character-string process determination section for determining what kind of the data processing is performed on either the character-string image or the information extracted from the character-string image, and a display section for displaying information with regard to that kind of the data processing determined by the document character-string process determination section.

This allows the user to select the data processing service performed on the character-string image, in reference to the information with regard to the data processing, which is displayed on the display section.

An image processing system of the present invention comprises: a plurality of data processing service devices that perform, on received data, respective data processing services that are different from each other, and return results of the data processing services; an image processing apparatus that performs image processing on an image including a character-string image, based on a result of data processing performed, by one of said plurality of data processing service devices, on either the character-string image or information extracted from the character-string image; and an information processing apparatus that is capable of communicating with the image processing apparatus, the image processing apparatus including a communication section for communicating with the data processing service devices and the information processing apparatus, the image processing system further comprising: a service address search section that is provided in the information processing apparatus, and searches for an address of a data processing service device that is capable of performing a required kind of data processing on either the character-string image or the information extracted from the character-string image; a character-string data processing service request section that is provided in either the image processing apparatus or the information processing apparatus, and sends, to the address searched by the service address search section, (i) the character-string image or the information extracted from the character-string image, and (ii) information for requesting the data processing service on either the character-string image or the information extracted from the character-string image; and a process result receiving section that is provided in the image processing apparatus, and receives, from one of the data processing service devices, a result of the data processing service performed on either the character-string image or the information extracted from the character-string image.

According to this arrangement, an efficient system is constructed because it is unnecessary to provide the service address search section in each image processing apparatus.

The above-described image processing system of the present invention may be arranged such that, the information processing apparatus includes a process search table storing (i) sets of information with regard to data processing functions of the respective data processing service devices and (ii) addresses of the respective data processing service devices that performs the data processing services corresponding to the data processing functions, the sets of information in (i) and the addresses in (ii) being associated with one another, and the service address search section searches for an address of a data processing service device that is capable of performing a required kind of data processing on either the character-string image or the information extracted from the character-string image, based on the sets of information stored in the process search table.

According to this arrangement, the image processing apparatus is simplified because it is unnecessary to provide the process search table in the image processing apparatus.

An image processing method of the present invention, which uses an image processing system adopting: a plurality of data processing service devices that perform, on received data, respective data processing services that are different from each other, and return results of the data processing services; and an image processing apparatus that is capable of communicating with the data processing service devices and performs image processing on an image including a character-string image, based on a result of data processing performed, by one of said plurality of data processing service devices, on either the character-string image or information extracted from the character-string image, comprises the steps of: (i) searching for an address of a data processing service device that is capable of performing a required kind of data processing on either the character-string image or the information extracted from the character-string image; (ii) sending, from the image processing apparatus to the address searched in the step (i), (I) the character-string image or the information extracted from the character-string image, and (II) information for requesting the data processing service on either the character-string image or the information extracted from the character-string image; and (iii) sending, from the data processing service device with the address searched in the step (i) to the image processing apparatus, a result of the data processing service performed on either the character-string image or the information extracted from the character-string image.

According to this image processing method, the image processing apparatus can receive a desired data processing service, by requesting an address searched by the service address search section to perform the data processing service (e.g. translation and commentary) on the character-string image. On this account, it is unnecessary to provide, in each image processing apparatus, the processing resources such as dictionary information and a program required for performing data processing on the character-string image or the information extracted from the character-string image.

The above-described image processing method may be arranged such that, the image processing system further includes an information processing apparatus that is capable of communicating with the image processing apparatus, and the step (i) is performed by the information processing apparatus.

In this case, it is unnecessary to provide the service address search section in the image processing apparatus. On this account, the image processing apparatus is further simplified.

An image processing program of the present invention is a program that causes a computer to execute the steps of the aforesaid image processing method. Therefore, by causing a computer to execute the program it is possible to allow the computer to realize the image processing method of the present invention.

In addition to the above, the image processing program of the present invention is easily stored and distributed when the program is stored in a computer-readable storage medium. Furthermore, by causing a computer to read the storage medium, it is possible to allow the computer to realize the image processing method of the present invention.

A computer data signal of the present invention represents the aforesaid program. For instance, by causing a computer to receive the data signal embedded in a carrier wave and execute the program, it is possible to allow the computer to realize the image processing method of the present invention.

The present invention may be arranged as an image processing apparatus that comprises image reading means for reading an image from a document, and image processing result output means that outputs a result of image processing on the image read by the image reading means, and is capable of communicating with a plurality of data processing service devices each performing a specific data processing service, the image processing apparatus being characterized by comprising: a document character-string process determination means for determining, in accordance with a document image data read out from the document by the image reading means, what kind of processing is performed on a character-string image included in the document image data; service address search means for searching an address of a data processing service device capable of performing the processing on the character-string image determined by the document character-string process determination means or on character-string information extracted from the character-string image; character-string data processing service request means for sending, to the address searched by the service address search means, at least a part of the document image data or the character-string information extracted therefrom, so as to request to perform the data processing service; and process result receiving means for receiving a result of the data processing service from the address to which the character-string data processing service request means sent the request, and the result of the data processing service obtained by the processing result receiving means being outputted.

With this arrangement, it is unnecessary to provide, in each image processing apparatus, processing resources such as dictionary information and a program, which are required for processing the character-string image in the document image, and it is possible to obtain a desired data processing service by requesting an address, which is searched by the service address search means, to perform a data processing service such as translation and commentary on the character-string image. As a result, it is possible to efficiently utilize the processing resources such as dictionary information and a program, which are required for performing data processing on the character-string image and are stored in data processing service devices around the world, the data processing service devices being able to communicate with each other over the Internet.

More specifically, the image processing apparatus may further include document language determination means for determining what kind of language is used in the character-string image in the document image data, and in a case where the language identified by the document language determination means is different from a set language having been set in advance, it is determined to perform, on the character-string image, a translation processing service by which the character-string image in the document image data or the character-string information extracted from the character-string image is translated into the set language.

According to this arrangement, for instance, when a language regularly used by the user is set in the image processing apparatus in advance, it is possible to obtain, from the data processing service device, a result of a translation processing service performed on a character-string image written in a language other than the language set in advance, and output the obtained result.

In this case, the document language determination means may determine a kind of language, in reference to a characteristic of an outline of each character image constituting the character-string image extracted from the document image data, and/or in reference to relative positions of the character images. The characteristic of the outline of each character image indicates, for instance, an aspect ratio of each character image. This makes it possible to determine a kind of language with a simple process.

In addition to the above, the image processing apparatus may further include word identification means for finding a word from the character-string image extracted from the document image data, and the document character-string process determination means determines, as the processing performed on the character-string image, a process of obtaining explanatory information of the word in the character-string image, based on the result of finding by the word identification means.

In this case, the image processing apparatus may further include word field determination means for determining a field to which the word found by the word identification means belongs, and the document character-string process determination means determines, as the processing performed on the character-string image, a process of obtaining explanatory information on a word in the field identified by the word field determination means.

With this, for instance, even when a word that the image processing apparatus cannot identify (e.g. a word in a specialized field not supported by the image processing apparatus) is included in the character-string image, it is possible to obtain the explanatory information of the word, from the data processing service device.

The result of the data processing service obtained from the data processing service device may be outputted as an image formed on a recording sheet after reading out a document image (e.g. photocopier), or may be supplied (outputted) as image data or e-mail data to another image processing apparatus or information processing apparatus, after reading out a document image (e.g. facsimile machine and scanner).

In addition to the above, the image processing apparatus may further include service selection means for displaying information with regard to at least one process that is determined by the document character-string process determination means and performed on the character-string image, so as to allow for the selection by the user, and when the selection on the processing on the character-string image is performed through the service selection means, the character-string image processing request means requests an address of a data processing service device that can perform the required process to perform the data processing service on the character-string image or the character-string information extracted therefrom.

According to this arrangement, a service is provided only at the user's desire (selection).

The present invention may be recognized as an image processing system in which the service address search means of the above-described image processing apparatus is provided in an information processing apparatus capable of communicating with the image processing apparatus.

That is, the image processing system of the present invention may be rephrased as an image processing system that comprises: at least one image processing apparatus including image reading means for reading an image from a document and image processing result output means that outputs a result of image processing on the image read by the image reading means; and an image processing apparatus capable of communicating with said at least one image processing apparatus, the image processing system being capable of data processing service apparatuses each performing a specific data processing service, and comprising: document character-string process determination means provided in the image processing apparatus or the information processing apparatus, for determining, in accordance with a document image data read out from the document by the image reading means, what kind of processing is performed on a character-string image included in the document image data; service address search means provided in the information processing apparatus, for searching an address of a data processing service device capable of performing that kind of processing on the character-string image determined by the document character-string process determination means; character-string data processing service request means provided in either the image processing apparatus or the information processing apparatus, for sending, to the address searched by the service address search means, at least a part of the document image data or the character-string information extracted therefrom, so as to request to perform the data processing service; and process result receiving means provided in either the image processing apparatus or the information processing apparatus, for receiving a result of the data processing service from the address to which the character-string data processing service request means sent the request, and the result of the data processing service obtained by the processing result receiving means being outputted from the image processing result output means of the image processing apparatus.

According to this arrangement, an efficient system is constructed because it is unnecessary to provide the service address search section in each image processing apparatus.

In a similar manner, the present invention may be recognized as an image processing method for performing the processes of the above-described means of the image processing apparatus.

That is, the image processing system of the present invention is an image processing method that uses an image processing apparatus including image reading means for reading an image from a document and image processing result output means that outputs a result of image processing on the image read by the image reading means, the image processing apparatus being connected to and being capable of communicating with a plurality of data processing service devices each performing a specific data processing service, the method comprising the steps of: (i) determining what kind of processing is performed on a character-string image included in the document image data read out from a document by the image reading means, in accordance with the document image data; (ii) searching an address of a data processing service device which is capable of performing the kind of processing determined in the step (i); (iii) sending, to the address searched in the step (ii), at least a part of the document image data or character-string information extracted therefrom, so as to request the data processing service; (iv) obtaining a result of the data processing service as a result of the step (iii), and (v) outputting the result of the data processing service obtained in the step (iv), by the image processing result output means.

In a similar manner, the present invention may be recognized as an image processing method performing the processes of the means of the image processing system.

That is, the image processing method of the present invention adopts: an image processing apparatus including image reading means for reading an image from a document and image processing result output means for outputting a result of image processing on an image read by the image reading means; and an information processing apparatus that is capable of communicating with the image processing apparatus, the image processing method being related to the image processing system that can communicate with a plurality of data processing service devices each performing a specific data processing service, the method comprises the steps of: (i) determining, in the image processing apparatus or the information processing apparatus, determining what kind of processing is performed on a character-string image included in the document image data read out from a document by the image reading means, in accordance with the document image data; (ii) searching, in the information processing apparatus, an address of a data processing service device that can perform the kind of processing on the character-string image, which is determined in the step (i); (iii) in the image processing apparatus or the information processing apparatus, sending, to the address searched in the step (ii), at least a part of the document image data and character-string information extracted therefrom, so as to request the data processing service; (iv) in the image processing apparatus or the information processing apparatus, receiving a result of the data processing service from the address to which the request is made in the step (iii); and (v) outputting, by the image processing result output means, the result of the data processing service obtained in the step (iv).

The present invention may be recognized as an image processing program for causing a computer to execute the steps of each of the aforesaid image processing methods, or a computer-readable storage medium storing the image processing program.

According to the present invention, in a circumstance where an image processing apparatus is connected to and capable of communicating with a plurality of data processing service devices each performing a specific data processing service, what kind of processing is performed on document image data readout from a document by image reading means is determined in accordance with the document image data. Then an address of a data processing service device capable of performing the kind of processing thus determined is searched. Then at least a part of the document image data or character-string information extracted therefrom is supplied to the address thus searched, and the data processing service is requested. From this address, a result of the data processing service is obtained, and the obtained result of the data processing service is outputted. With this arrangement, it is unnecessary to provide, in each of the image processing apparatus, processing resources such as dictionary information and a program, which are required for the processing of the character-string image in the document image. On this account, the image processing apparatus can receive a necessary image processing service, by requesting the searched address to perform the data processing service on the character-string image, such as translation and commentary. As a result, it is possible to efficiently utilize the processing resources such as dictionary information and a program, which are required for performing data processing on the character-string image and are stored in data processing service devices around the world, the data processing service devices being able to communicate with each other over the Internet.

The present invention may be recognized as an image processing apparatus reading out an image from a document and performing image processing on a character-string image in the document image, an image processing system, an image processing method, an image processing program, and a computer-readable storage medium storing the image processing program.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An image processing system, comprising:
 a plurality of data processing service devices that perform, on received data, respective data processing services that are different from each other, and return results of the data processing services;
 an image processing apparatus that performs image processing on an image including a character-string image, based on a result of data processing performed, by one of said plurality of data processing service devices, on either the character-string image or information extracted from the character-string image; and
 an information processing apparatus that is capable of communicating with the image processing apparatus, the image processing apparatus including a communication section for communicating with the data processing service devices and the information processing apparatus,
 the image processing system further comprising:
 a service address search section that is provided in the information processing apparatus, and searches for an address of a data processing service device that is capable of performing a required kind of data processing on either the character-string image or the information extracted from the character-string image;
 a character-string data processing service request section that is provided in either the image processing apparatus or the information processing apparatus, and sends, to the address searched by the service address search section, (i) the character-string image or the information extracted from the character-string image, and (ii) information for requesting the data processing service on either the character-string image or the information extracted from the character-string image; and
 a process result receiving section that is provided in the image processing apparatus, and receives, from one of the data processing service devices, a result of the data processing service performed on either the character-string image or the information extracted from the character-string image.

2. The image processing system as defined in claim 1, wherein,
 the information processing apparatus includes a process search table storing (i) sets of information with regard to data processing functions of the respective data processing service devices and (ii) addresses of the respective data processing service devices that performs the data processing services corresponding to the data processing functions, the sets of information in (i) and the addresses in (ii) being associated with one another, and
 the service address search section searches for an address of a data processing service device that is capable of performing a required kind of data processing on either the character-string image or the information extracted from the character-string image, based on the sets of information stored in the process search table.

3. An image processing method that uses an image processing system adopting: a plurality of data processing service devices that perform, on received data, respective data processing services that are different from each other, and return results of the data processing services; and an image processing apparatus that is capable of communicating with the data processing service devices and performs image processing on an image including a character-string image, based on a result of data processing performed, by one of said plurality of data processing service devices, on either the character-string image or information extracted from the character-string image,
 the image processing method comprising the steps of:
 (i) searching for an address of a data processing service device that is capable of performing a required kind of data processing on either the character-string image or the information extracted from the character-string image;
 (ii) sending, from the image processing apparatus to the address searched in the step (i), (I) the character-string image or the information extracted from the character-string image, and (II) information for requesting the data processing service on either the character-string image or the information extracted from the character-string image; and
 (iii) sending, from the data processing service device with the address searched in the step (i) to the image processing apparatus, a result of the data processing service performed on either the character-string image or the information extracted from the character-string image.

4. The image processing method as defined in claim 3, wherein, the image processing system further includes an information processing apparatus that is capable of communicating with the image processing apparatus, and the step (i) is performed by the information processing apparatus.

5. A computer-readable storage medium storing an image processing program that causes a computer to execute an image processing method that uses an image processing system adopting: a plurality of data processing service devices that perform, on received data, respective data processing services that are different from each other, and return results of the data processing services; and an image processing apparatus that is capable of communicating with the data processing service devices and performs image processing on an image including a character-string image, based on a result of data processing performed on either the character-string image or information extracted from the character-string image, the image processing method comprising the steps of:

(i) searching for an address of a data processing service device that is capable of performing a required kind of data processing on either the character-string image or the information extracted from the character-string image;

(ii) sending, from the image processing apparatus to the address searched in the step (i), (I) the character-string image or the information extracted from the character-string image, and (II) information for requesting the data processing service on either the character-string image or the information extracted from the character-string image; and (iii) sending, from the data processing service device with the address searched in the step (i) to the image processing apparatus, a result of the data processing service performed on either the character-string image or the information extracted from the character-string image.

* * * * *